United States Patent

Ward

[15] 3,691,592
[45] Sept. 19, 1972

[54] SHRIMP DEHEADER
[72] Inventor: Hubert Ward, 1412 Choctan Ave., Metairie, La. 70005
[22] Filed: May 7, 1971
[21] Appl. No.: 141,295

[52] U.S. Cl. .................................................17/71
[51] Int. Cl. .............................................A22c 29/00
[58] Field of Search ........................17/71, 73, 48, 65

[56] References Cited

UNITED STATES PATENTS

| | | | |
|---|---|---|---|
| 3,408,686 | 11/1968 | Stephenson | 17/71 |
| 2,534,767 | 12/1950 | Greiner et al. | 17/71 X |
| 1,565,365 | 12/1925 | Hidzick | 17/65 |

FOREIGN PATENTS OR APPLICATIONS

| | | | |
|---|---|---|---|
| 474,991 | 7/1951 | Canada | 17/51 |

Primary Examiner—Aldrich F. Medbery
Assistant Examiner—J. F. Pitrelli
Attorney—Berman, Davidson and Berman

[57] ABSTRACT

A shrimp deheader consisting of an inclined housing having a top shrimp inlet chute and a bottom deheaded shrimp outlet chute, with a series of coupled driven cylindrical drums journaled therebetween, the drums having spaced bars on their peripheral surfaces. Stationary inclined baffles are located between the drums, and water jet nozzles are mounted above and directed toward the gaps between the lower edges of the baffles and the drums adjacent thereto, the jets from the nozzles aiding the heads of shrimp moving toward the drums to become loosened and detached.

10 Claims, 4 Drawing Figures

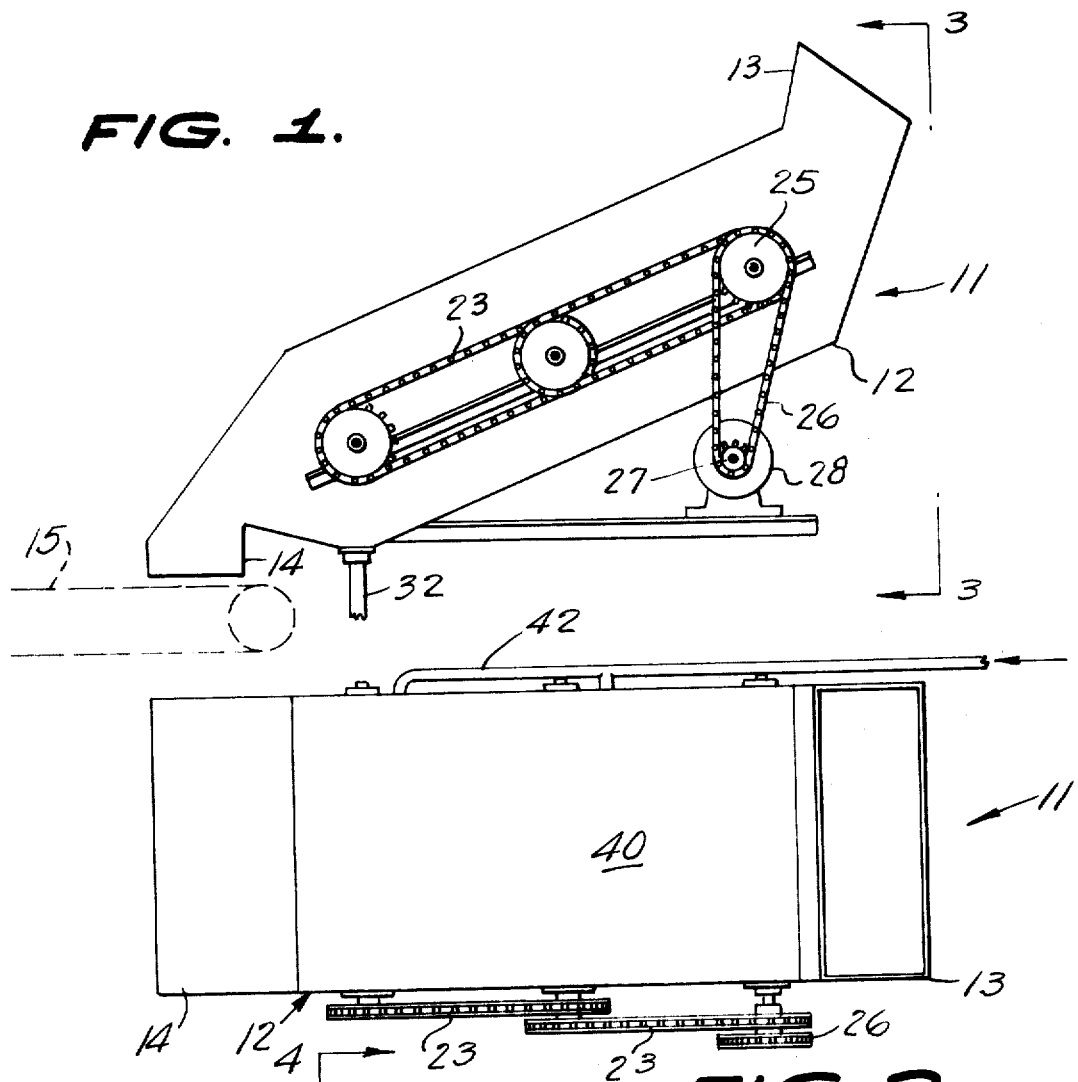
FIG. 1.
FIG. 2.
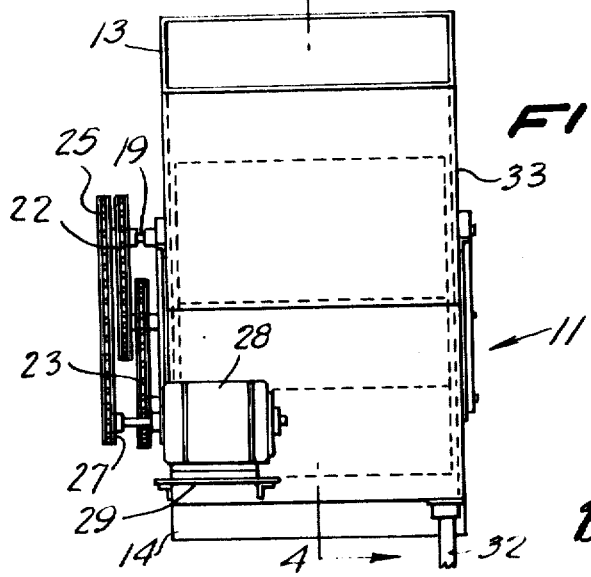
FIG. 3.
INVENTOR.
HUBERT WARD,
BY
Berman, Davidson & Berman,
ATTORNEYS

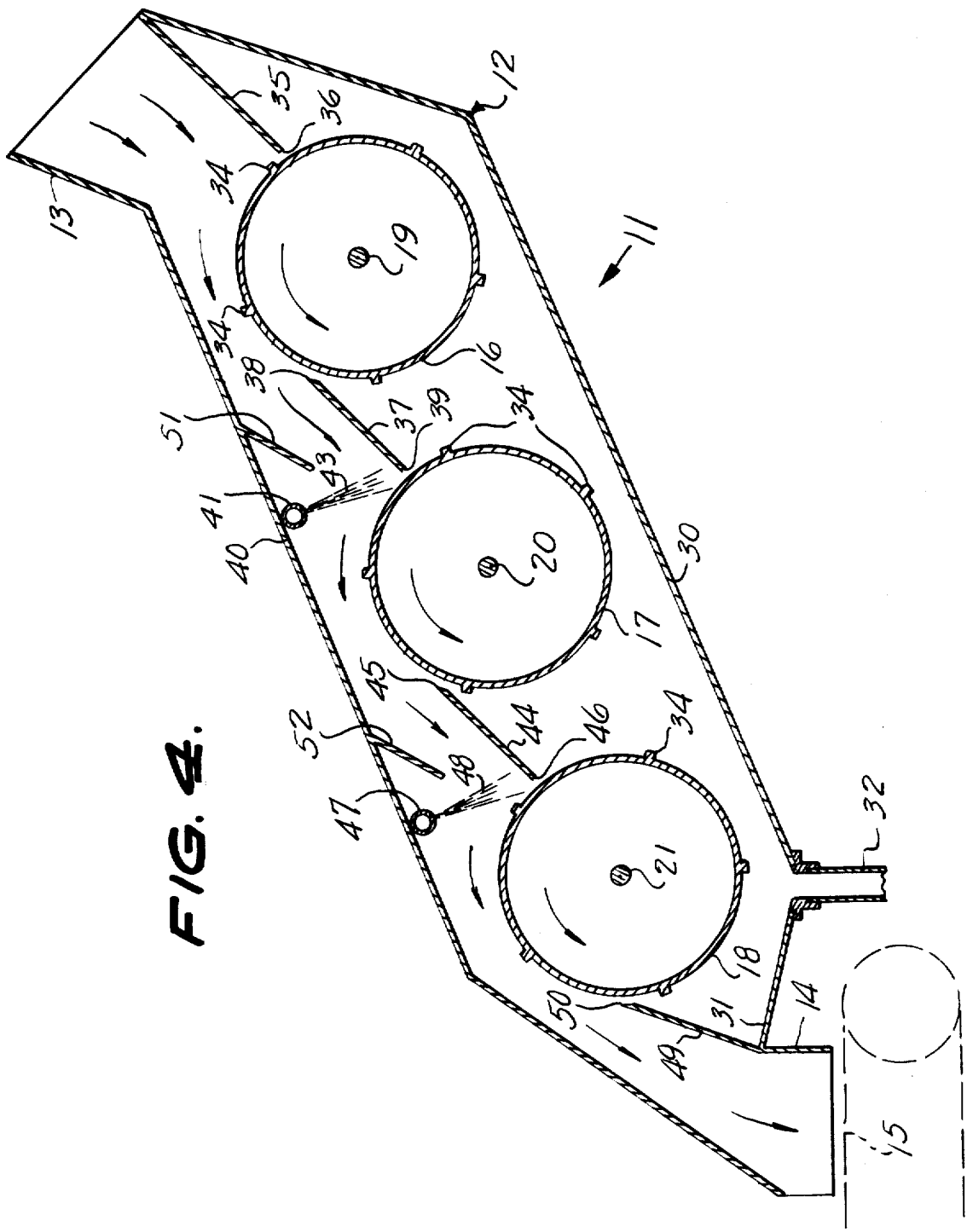

SHRIMP DEHEADER

This invention relates to food processing apparatus and more particularly to a shrimp deheader.

A main object of the invention is to provide a novel and improved apparatus for removing the heads of shrimp, the apparatus being simple in construction, efficient in operation, and providing a means for quickly and efficiently removing the heads of shrimp without the use of human labor.

A further object of the invention is to provide an improved shrimp deheading apparatus which is relatively compact in size, which is durable in construction, has a high processing capacity, and is substantially self-cleaning.

A still further object of the invention is to provide an improved shrimp deheading apparatus which efficiently removes the heads of shrimp, avoiding undesired damage to the edible body portions thereof, the apparatus requiring a minimum amount of human supervision, and being effective in its action with a wide range of sizes of shrimp.

Further objects and advantages of the invention will become apparent from the following description and claims, and from the accompanying drawings, wherein:

FIG. 1 is a side elevational view of an improved shrimp deheading apparatus constructed in accordance with the present invention.

FIG. 2 is a top view of the shrimp deheading apparatus of FIG. 1.

FIG. 3 is an end elevational view of the apparatus of FIGS. 1 and 2, such view being taken substantially on the line 3—3 of FIG. 1.

FIG. 4 is an enlarged longitudinal vertical cross-sectional view taken substantially on the line 4—4 of FIG. 3.

Referring to the drawings, 11 generally designates an improved shrimp deheading machine constructed in accordance with the present invention. The machine 11 comprises an inclined stationary chute or housing 12 having an upwardly facing inlet passage portion 13, namely, at its right end as viewed in FIG. 1, and having a downwardly facing outlet passage portion 14 at its opposite end, namely at its left end as viewed in FIG. 1. The discharge chute portion 14 may be located immediately over a belt conveyor, shown in dotted view at 15, for moving the shrimp discharged from the chute 14 toward another chute for further processing.

The inclined housing or main chute 12 is rectangular in cross-section and journaled horizontally therein on transverse axes are respective rotary drum members 16, 17 and 18, the drum members being mounted on transverse shafts 19, 20 and 21, which are supported by suitable bearings in the opposite vertical walls of the main chute 12. The shafts 19, 20 and 21 are provided with sprockets and are coupled together for simultaneous rotation in a counterclockwise direction, as viewed in FIG. 4, by sprocket chains shown at 22 and 23 in FIG. 3. The uppermost shaft 19 is provided with an additional sprocket 25 which is drivingly coupled by a sprocket chain 26 to the output sprocket 27 of an electric motor 28 mounted on a suitable supporting platform 29 rigidly secured beneath the bottom wall 30 of the inclined main housing or chute member 12.

As shown in FIG. 4, the inclined bottom wall 30 converges downwardly with respect to a forward inclined bottom wall portion 31 provided beneath and at the left side of the lowermost rotary drum member 18, and a depending drain conduit 32 is connected to the junction between the sloping wall elements 30 and 31 adjacent the vertical longitudinal side wall 33 opposite the location of the drum-driving sprocket chains.

Rigidly secured longitudinally on each of the rotary drums 16, 17 and 18 at equal spacings around its peripheral surface are outwardly projecting ribs or bars 34. The shrimp inlet chute 13 is provided with a transverse inclined guide plate 35 which extends downwardly and to the left, as viewed in FIG. 4, from the intake opening of the chute 13. Thus, the guide plate 35 in effect comprises the receiving bottom wall of chute 13, and the lower edge 36 of guide plate 35 terminates adjacent the drum 16, but short of the path of movement of the ribs 34 thereon. The gap between edge 36 and the rotating drum 16 is insufficient to allow shrimp to drop downwardly past the edge 36, but is small enough to allow the ribs 34 to move the shrimp sliding down baffle plate 35 along the drum 16 as it rotates in a counterclockwise direction, as viewed in FIG. 4.

Transversely mounted between the upper portions of drums 16 and 17 is an inclined guide plate 37 whose upper edge 38 terminates adjacent the periphery of drum 16, with sufficient clearance to allow free passage of the ribs 34. The clearance, however, is small enough to prevent shrimp carried on the drum from dropping downwardly between edge 38 and drum 16. The transverse baffle plate 37 is inclined downwardly and to the left as viewed in FIG. 4, terminating adjacent the periphery of the drum 17, with sufficient clearance to allow free passage of the longitudinal ribs 34 thereon. A gap is defined between the bottom edge 39 of plate 37 and the rotating drum 17. Mounted in the top portion of the main housing 12 adjacent the top wall 40 thereof and above the gap between edge 39 and drum 17 is a transversely extending jet tube 41 formed with jet apertures in its bottom spaced along its length and directed downwardly toward the gap between edge 39 and drum 17. The jet tube 41 is connected at its outer end to a supply conduit 42 which is in turn connected to a supply of water under pressure. The jet stream, shown at 43, from the nozzle tube 41 is directed to the gap between the lower edge of plate 37 and drum 17 and is of considerable force, sufficient to loosen the heads of shrimp flung over the inclined baffle plate 37, the force being sufficient in many instances to detach the heads.

A similar inclined baffle plate 44 is mounted transversely in the housing 12 between the upper portions of the rotating drums 18 and 17, being oriented in substantially the same manner as the inclined baffle plate 37, the top edge 45 of the plate 44 extending adjacent the periphery of the drum 17 with sufficient clearance to provide free passage of the ribs 34 therepast, being arranged substantially tangentially to drum 17, in the same manner that the baffle plate 37 is arranged substantially tangentially to the drum 16. The lower edge 46 of plate 44 extends adjacent the periphery of drum 18 but clearance is provided to allow free movement of the ribs 34 of drum 18 therepast. A gap is defined between edge 46 and drum 18 sufficient to allow water to drop therethrough. Mounted adjacent top wall 40 over said gap is a second transversely extending jet tube 47 with bottom jet apertures arranged so that a jet 48 therefrom is directed toward the gap between edge 46 and drum 18, similar to the manner in which jet 43 is directed to the gap between edge 39 and drum 17. The nozzle tube 47 is connected to the common high pressure water supply conduit 42. The action of the jets 48 is somewhat similar to the action of the jets 43 in that they engage against the head portions of shrimp flung over the baffle plate 44, further loosening said head portions and causing them to become detached from the main edible body portions of the shrimp.

The discharge chute 14 is provided adjacent the top edge of the inclined wall portion 31 with an upstanding transversely extending guide plate 49 which is inclined upwardly and to the right, as viewed in FIG. 4, terminating adjacent the periphery of drum 18 and extending substantially tangentially thereto, with sufficient clearance to allow free movement of the ribs 34 therepast. The gap between the top edge 50 of plate 49 and drum 18 is insufficient to allow movement of the shrimp body portions therethrough, so that the shrimp body portions are diverted leftwardly of edge 50 into the outlet chute 14. The deheaded shrimp are thus guided onto the conveyor 15 subjacent chute 14 to be moved to locations for further processing.

Respective inclined baffle plates 51 and 52 are provided adjacent top wall 40, being inclined downwardly and to the left therefrom and being located above the inclined baffle plates 37 and 44. The transversely extending inclined baffle plates 51 and 52 serve as abutments against which the shrimp are flung. Thus, the baffle plates 51 and 52 have bottom edges which terminate above the lower portions of the inclined baffle plates 37 and 44 and are spaced away from the path of the main jets 43 and 48, namely, being spaced to the right therefrom, as viewed in FIG. 4, so as not to interfere with the action of said main jets.

In operation, the shrimp to be deheaded are supplied through the inlet chute 13 and slide down the guide plate 35 into engagement with the rotating drum 16.

The drums rotate at a rate of approximately 300 RPM. The shrimp are engaged by the ribs 34 of drum 16 and are flung against the baffle plate 51, which diverts them into contact with the second drum 17. The ribs 34 of drum 17, in turn, engage the shrimp and fling them against the second inclined upper baffle plate 52, which diverts them into contact with the third drum 18, whose ribs 34 fling them into the discharge chute 14.

The shrimp are partially deheaded after contact with the ribs 34 of first drum 16, and just prior to contact with the ribs of second drum 17 they pass under the transverse row of jets 43, which substantially completes the deheading action. After contact with the ribs 34 of second drum 17 and passage through the second transverse row of water jets 48 and contact with the ribs 34 of third drum 18, the shrimp fall out of the discharge chute 14 onto the belt conveyor 15 completely deheaded and washed.

The heads and other debris are subsequently removed from the conveyor 15 by a separate procedure not covered herein.

The drain conduit 32 serves to drain off the water from the spray jets 43, 48.

It will be readily apparent that the apparatus above described may be employed in any desired orientation. Thus, the machine may be employed either in a vertical position, a horizontal position or a diagonal position.

While a specific embodiment of an improved shrimp deheading apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A shrimp deheading apparatus comprising a main chute member for receiving shrimp and having an inlet passage at one end and an outlet passage at its other end, rotary drum means journaled horizontally in said chute member, drive means coupled to said drum means, spaced projections on the periphery of said drum means, inclined guide plate means between said inlet passage and said drum means and extending adjacent said periphery of the drum means, baffle plate means mounted over and spaced above said guide plate means and being inclined downwardly toward said drum means, and liquid jet means mounted in said chute member above and directed substantially toward said drum means for applying a jet force to separate the head from the body of the shrimp.

2. The shrimp deheading apparatus of claim 1, and wherein said main chute member is inclined downwardly from said inlet passage toward said outlet passage.

3. The shrimp deheading apparatus of claim 2, and wherein said liquid jet means comprises a conduit mounted transversely in the chute member and having spaced bottom jet orifices.

4. The shrimp deheading apparatus of claim 3, and wherein said guide plate means is inclined downwardly toward said drum means and has an edge located closely adjacent the path of movement of said spaced projections.

5. The shrimp deheading apparatus of claim 4, and wherein said drum means comprises a plurality of successive horizontally journaled rotary drums, each having spaced projections on its periphery, and means drivingly coupling the drums together for simultaneous rotation in the same direction, wherein said guide plate means includes respective inclined guide plates mounted transversely in the main chute member between the upper portions of adjacent rotary drums and having transverse edges located relatively closely adjacent to the paths of movement of the projections, defining respective relatively narrow gaps relative to the drums, and wherein a transverse bottom-apertured jet conduit is provided above each gap.

6. The shrimp deheading apparatus of claim 5, and drain conduit means connected to the bottom wall of the main chute member.

7. The shrimp deheading apparatus of claim 6, and wherein said bottom wall has downwardly convergent portions adjacent said outlet passage, said drain conduit means being connected substantially to the junction of said downwardly convergent portions.

8. The shrimp deheading apparatus of claim 7, and outlet guide plate means mounted in said outlet passage and extending downwardly and substantially tangentially from the peripheral portion of the lowermost rotary drum.

9. The shrimp deheading apparatus of claim 8, and wherein said baffle plate means comprises respective baffle plates mounted in the top portion of said main chute member between the respective liquid jet conduits and the upwardly adjacent rotary drums.

10. The shrimp deheading apparatus of claim 9, and inlet guide plate means mounted in said inlet passage and being inclined downwardly toward and terminating closely adjacent to the periphery of the uppermost rotary drum.

* * * * *